R. M. CLARK.
TANK GATE.
APPLICATION FILED NOV. 11, 1910.
990,706.
Patented Apr. 25, 1911.
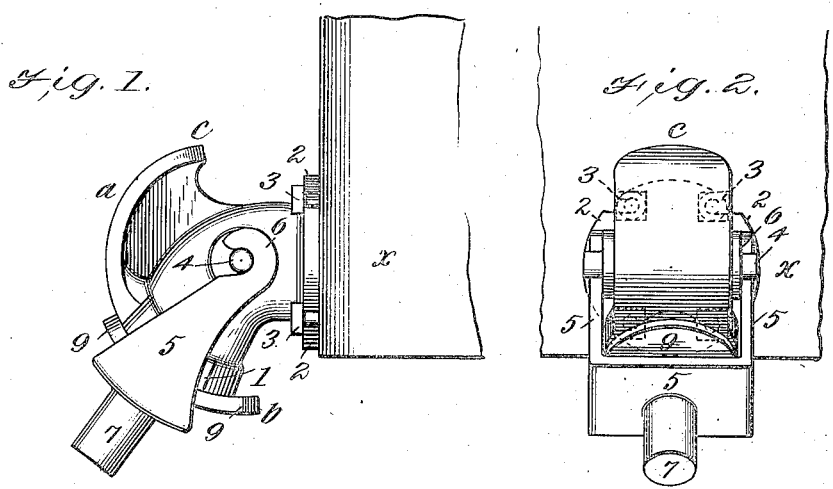
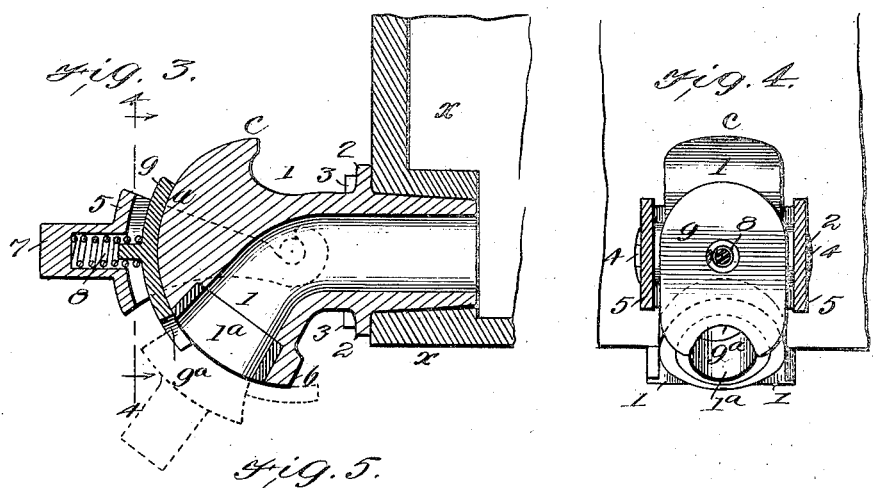
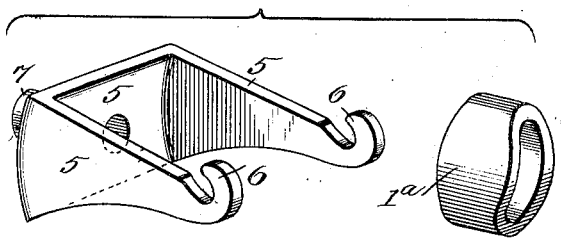
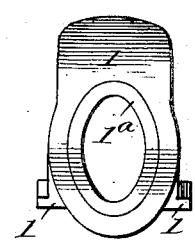
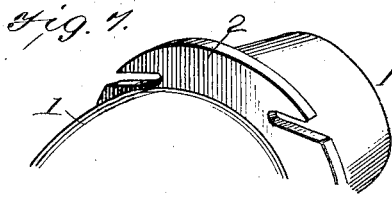
WITNESSES:
F. C. Barry
Amos W Hart
INVENTOR
REUBEN M. CLARK
BY Munn & Co.
ATTORNEYS

UNITED STATES PATENT OFFICE.

REUBEN M. CLARK, OF WEBB CITY, MISSOURI.

TANK-GATE.

990,706.  Specification of Letters Patent.  Patented Apr. 25, 1911.

Application filed November 11, 1910. Serial No. 591,841.

*To all whom it may concern:*

Be it known that I, REUBEN M. CLARK, a citizen of the United States, and a resident of Webb City, in the county of Jasper and State of Missouri, have invented certain Improvements in Tank-Gates, of which the following is a specification.

My invention is an improved discharge gate for jigs, settling tanks, or other receptacles for liquids containing water with sand, tailings, or other earthy or mineral matter in a finely divided state.

The details of construction, arrangement, and operation of parts are as hereinafter described, and illustrated in the accompanying drawings, in which—

Figures 1 and 2 are, respectively, side and front views of my invention, together with a portion of a tank to which it is shown applied. Fig. 3 is a longitudinal section of the parts shown in Figs. 1 and 2. Fig. 4 is a vertical section on the line 4—4 of Fig. 3. Fig. 5 includes perspective views of the gate proper and the detachable bushing for the body of the gate. Fig. 6 is a face view of the discharge end of the gate tube with bushing inserted. Fig. 7 is a perspective view of a portion of the notched collar of the gate body.

The body of the gate tube 1 is shown provided with an integral, radial, and circumferential collar or flange 2, which, when the tapered inner end of the tube is inserted in a tank $x$, abuts the latter at the edge of the opening. This collar is provided with notches or open slots, as shown in Fig. 7, which receive screws or screw bolts 3 by which the tube is detachably secured to the tank. I thus provide a much more secure attachment than the usual one, which is formed by threading the tube and screwing it into the tank.

The enlarged head of the tube 1 is curved as usual, but the curve while concentric from $a$ to $b$ (Fig. 3) is eccentric from $a$ to $c$, the curve $a$—$c$ being of slightly less radius than the curve $a$—$b$ which is concentric with the trunnions 4 that project from the sides of the tube. The purpose of this will be presently described.

The gate proper 5 is constructed with parallel arms whose ends terminate in open hooks 6 adapted to detachably engage the trunnions 4. The gate is provided with a recessed handle 7 in which is arranged a spiral spring 8 that bears upon a wear plate 9 whose curvature corresponds to that of the face or end of the gate body over which it is adapted to slide with the gate proper.

An elliptical bushing $1^a$ is provided for the discharge opening of the gate body. In the ordinary gate of this type, the wear plate 9 works in direct contact with the face or end of the gate body and when the latter is worn to a certain degree, the entire gate is rejected and thrown away and is therefore a complete loss. By providing a removable bushing $1^a$, when the same becomes worn, it may be replaced by another at small expense and thus the remainder of the gate may be utilized for a long period and the expense of providing another saved. The bushing is made of hardened steel and is thus adapted to withstand wear for a long time. It is adapted to be reversed in position or turned half way around, when worn on its upper edge by contact with the wear plate 9, whose lower portion covers the bushing sufficiently, even when the gate is retracted or opened, to hold the bushing in place.

Gates of this type must be provided with a very strong spring which renders the removal of the bushing difficult. By constructing the curved face of the gate body with a less radius from $a$ to $c$, it is obvious that when the gate is opened widely, the tension of the spring will be less, or, in other words, the wear plate 9 will be pressed forcibly against the gate body which enables the gate to be opened more easily than would otherwise be the case. This difference in radius of the curved face of the gate body therefore facilitates replacement of the wear plate and also the bushing.

As shown in Fig. 6, the discharge orifice of the tube 1 is elliptical, the longer axis of the ellipse being in the direction of the curve of the face of the discharge tube. The wear plate 9 is also provided with a notch $9^a$ in its lower end which is semi-elliptical in form. It will be perceived that by this form and construction, when the gate is opened, the orifice is more nearly circular and therefore of greater capacity than would be the case if the orifice were circular. This form concentrates the sand, tailings, or other material so that the water in discharging has a greater effect thereon. Thus a greater quantity of heavy material is discharged with a less quantity of water, which is an advantage of considerable importance.

What I claim is:—

1. The combination with a discharge tube having a curved face and a swinging gate pivoted thereto, the portion adjacent to the discharge orifice being concentric with the gate pivots and the remaining portion being of lesser radius, and a spring-pressed wear plate interposed between the gate and face, as shown and described.

2. In a gate of the type indicated, the combination with the body and a removable and reversible, elliptical bushing fitted loosely in the discharge orifice, of a swinging gate pivoted on the body and having a spring-pressed wear-plate which works in contact with the face of the body and extends over the bushing, so as to hold it normally in place, as shown and described.

REUBEN M. CLARK.

Witnesses:
A. D. HATTEN,
J. FRANK TODD.